United States Patent
Ito et al.

(10) Patent No.: US 9,915,928 B2
(45) Date of Patent: Mar. 13, 2018

(54) AVAILABILITY PREDICTION APPARATUS FOR ELECTRIC POWER STORAGE DEVICE

(71) Applicants: DENSO CORPORATION, Kariya, Aichi-pref. (JP); National University Corporation Nagoya University, Nagoya-shi, Aichi-ken (JP)

(72) Inventors: Akira Ito, Nukata-gun (JP); Junichirou Kanamori, Nisshin (JP); Mitsuru Fujita, Kuwana (JP); Tatsuya Suzuki, Nagoya (JP); Shinkichi Inagaki, Nagoya (JP); Takuma Yamaguchi, Nagoya (JP); Masahiro Sumiya, Nagoya (JP)

(73) Assignees: DENSO CORPORATION, Kariya, Aichi-pref. (JP); National University Corporation Nagoya University, Nagoya-Shi, Aichi-Ken (JP)

( * ) Notice: Subject to any disclaimer, the term of this patent is extended or adjusted under 35 U.S.C. 154(b) by 593 days.

(21) Appl. No.: 14/043,003

(22) Filed: Oct. 1, 2013

(65) Prior Publication Data
US 2014/0094981 A1   Apr. 3, 2014

(30) Foreign Application Priority Data

Oct. 2, 2012   (JP) .................. 2012-220682

(51) Int. Cl.
*G05B 13/02* (2006.01)
*B60L 3/12* (2006.01)
*B60L 11/18* (2006.01)

(52) U.S. Cl.
CPC .............. *G05B 13/026* (2013.01); *B60L 3/12* (2013.01); *B60L 11/1816* (2013.01);
(Continued)

(58) Field of Classification Search
CPC ...... G05B 13/026; B60L 3/12; B60L 11/1816; B60L 11/1842; B60L 2230/22;
(Continued)

(56) References Cited

U.S. PATENT DOCUMENTS 8,700,187 B2 *   4/2014   Forbes, Jr. ............. G01D 4/004
                                                      323/299
8,996,183 B2 *   3/2015   Forbes, Jr. ............. G06Q 10/00
                                                      700/291

(Continued)

FOREIGN PATENT DOCUMENTS

JP   2011-205828   10/2011
JP   2011-244682   12/2011
(Continued)

OTHER PUBLICATIONS

Chawla, Advanced Algorithms, p. 1 and p. 6, 2007.*
(Continued)

*Primary Examiner* — Kenneth M Lo
*Assistant Examiner* — Michael J. Huntley
(74) *Attorney, Agent, or Firm* — Harness, Dickey & Pierce, P.L.C.

(57) ABSTRACT

An availability prediction apparatus includes an access section that accesses a storage section and a prediction section. The storage section stores availability specified periods occurred before a present time associated with respective frequencies of the availability specified periods, and the access section acquires the availability specified periods from the storage section. The prediction section predicts at least one target availability specified period within a prediction term, which begins at the present time and ends at a time later than the present time by a predetermined term. The prediction section includes a correlating section that correlates the availability specified periods with (Continued)

candidate periods included in the prediction term, and a selection section that specifies and selects one of the candidate periods having a highest occurrence probability as the target availability specified period.

13 Claims, 7 Drawing Sheets

(52) U.S. Cl.
CPC ....... *B60L 11/1842* (2013.01); *B60L 2230/22* (2013.01); *B60L 2260/58* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC ............... B60L 2260/58; Y02E 60/721; Y02T 10/7005; Y02T 10/7088; Y02T 90/121; Y02T 90/128; Y02T 90/14; Y02T 90/163; Y04S 10/126
USPC .......................................................... 700/291
See application file for complete search history.

(56) References Cited

U.S. PATENT DOCUMENTS

| | | | |
|---|---|---|---|
| 9,112,382 B2* | 8/2015 | Paul | G06Q 50/06 |
| 9,469,203 B2* | 10/2016 | Momose | B60L 11/1809 |
| 2002/0099500 A1* | 7/2002 | Schmier | G08G 1/123 |
| | | | 701/532 |
| 2008/0040479 A1* | 2/2008 | Bridge | B60L 3/12 |
| | | | 709/224 |
| 2008/0052145 A1* | 2/2008 | Kaplan | G06Q 10/0631 |
| | | | 705/7.12 |
| 2008/0094013 A1* | 4/2008 | Su | B60L 11/1811 |
| | | | 318/139 |
| 2009/0040029 A1* | 2/2009 | Bridges | G06Q 50/06 |
| | | | 340/12.37 |
| 2009/0043520 A1* | 2/2009 | Pollack | B60L 3/12 |
| | | | 702/62 |
| 2009/0063680 A1* | 3/2009 | Bridges | B60L 11/1824 |
| | | | 709/224 |
| 2009/0101421 A1* | 4/2009 | Oyobe | B60K 6/26 |
| | | | 180/65.29 |
| 2010/0235008 A1* | 9/2010 | Forbes, Jr. | G06Q 10/00 |
| | | | 700/291 |
| 2011/0178959 A1* | 7/2011 | Nakajima | B60L 11/1824 |
| | | | 705/412 |
| 2011/0202418 A1* | 8/2011 | Kempton | B60L 11/1824 |
| | | | 705/26.1 |
| 2011/0282513 A1* | 11/2011 | Son | B60L 11/1816 |
| | | | 700/297 |
| 2012/0112698 A1* | 5/2012 | Yoshimura | G06Q 30/04 |
| | | | 320/109 |
| 2012/0133337 A1* | 5/2012 | Rombouts | H02J 3/32 |
| | | | 320/155 |
| 2012/0245750 A1* | 9/2012 | Paul | G06Q 50/06 |
| | | | 700/291 |
| 2012/0253567 A1* | 10/2012 | Levy | B60L 11/1844 |
| | | | 701/22 |
| 2013/0024035 A1 | 1/2013 | Ito et al. | |
| 2013/0041941 A1* | 2/2013 | Tomasic | G08G 1/123 |
| | | | 709/203 |
| 2013/0073507 A1 | 3/2013 | Sera | |
| 2014/0018969 A1* | 1/2014 | Forbes, Jr. | H02J 3/32 |
| | | | 700/295 |
| 2015/0306967 A1* | 10/2015 | Cohen | B60L 11/1825 |
| | | | 701/32.3 |

FOREIGN PATENT DOCUMENTS

| | | |
|---|---|---|
| JP | 2011-254653 | 12/2011 |
| JP | 2012-120295 | 6/2012 |
| JP | 2013-027214 | 2/2013 |

OTHER PUBLICATIONS

Office Action dated Sep. 15, 2015 in the corresponding JP application No. 2012-0073507 (in Japanese with English translation).

* cited by examiner

AVAILABILITY PREDICTION APPARATUS FOR ELECTRIC POWER STORAGE DEVICE

CROSS REFERENCE TO RELATED APPLICATION

This application is based on Japanese Patent Application No. 2012-220682 filed on Oct. 2, 2012, the disclosure of which is incorporated herein by reference.

TECHNICAL FIELD

The present disclosure relates to an availability prediction apparatus for an electric power storage device of an electric power system that executes an electric power transfer control using the electric power storage device.

BACKGROUND

As disclosed in JP 2011-244682 A (corresponding to US 2011/0282513 A1), a system including electric devices of a residence uses a vehicle battery or charges the vehicle at a most appropriate time in order to adjust a balance between supply and demand of electric power.

In order to use the vehicle battery appropriately in an adjustment of the balance between supply and demand of electric power, a utilization plan of the vehicle battery needs to be created. The utilization plan of the vehicle battery is created based on a system state at a present time and a predicted balance between supply and demand of electric power in the future. This is because, an optimum value in the utilization plan during a limited time scale is not always equal to an optimum value in the utilization plan during a long-term time scale. In this case, information indicating whether the vehicle battery is to be connected to the system in the future with respect to the present time needs to be acquired in advance. Suppose that the information is acquired only by an input operation performed by a user. In this case, the utilization plan of the vehicle battery cannot be properly created when the input operation is not performed by the user or the information input by the user is not updated.

SUMMARY

In view of the foregoing difficulties, it is an object of the present disclosure to provide an availability prediction apparatus for an electric power storage device, which is capable of appropriately predicting an availability specified period of the electric power storage device.

According to an aspect of the present disclosure, an availability prediction apparatus for an electric power storage device of an electric power system that executes an electric power transfer control using the electric power storage device includes an access section and a prediction section. The access section accesses a storage section storing a plurality of availability specified periods occurred before a present time associated with respective frequencies of the availability specified periods and acquires the availability specified periods and the respective frequencies of the availability specified periods from the storage section. The availability specified periods are available periods or unavailable periods. During the available periods, the electric power storage device is available for the electric power transfer control, and during the unavailable periods, the electric power storage device is unavailable for the electric power transfer control. The prediction section executes a prediction process in order to predict at least one target availability specified period to be occurred within a prediction term based on the availability specified periods and the respective frequencies of the availability specified periods acquired by the access section. The prediction term begins at the present time and ends at a time later than the present time by a predetermined term. The prediction section includes a correlating section and a selection section. The correlating section correlates the availability specified periods acquired by the access section with a plurality of candidate periods included in the prediction term. The selection section specifies and selects one of the candidate periods having a highest occurrence probability, which is correlated with one of the availability specified periods having a highest frequency. The prediction section sets the one of the candidate periods having the highest occurrence probability as the target availability specified period. The electric power transfer control is executed within the electric power system based on the target availability specified period.

With the above apparatus, the availability specified period having the highest occurrence probability in the prediction term is selected as the target availability specified period, and the electric power transfer control is executed based on the availability specified period having the highest occurrence probability. Thus, a prediction accuracy of the availability specified period in the prediction term is improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

The following will describe a first embodiment of the present disclosure with reference to the drawings.

Figure 1:
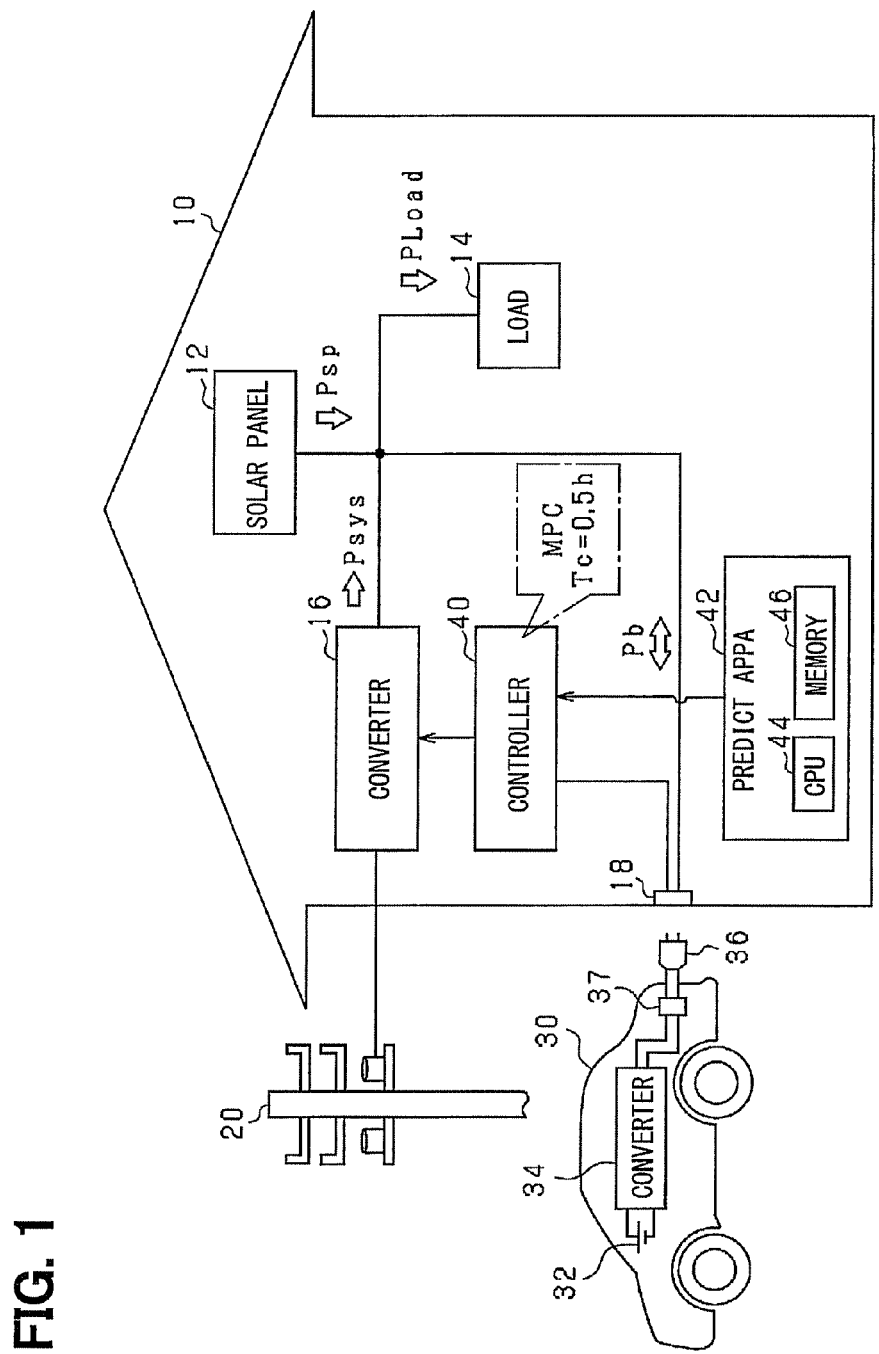
FIG. 1 is a diagram showing a configuration of an electric power system according to a first embodiment of the present disclosure.

As shown in FIG. 1, a residence 10 is a standard house building as well known.

The residence 10 includes a solar panel 12 as an electric power generation section and a load 14 as an electric power consumption section. The residence 10 further includes a converter 16 that converts electric power supplied from an external utility grid 20 in order to provide the electric power to the residence 10. Hereinafter, the converter 16 is also referred to as a residence converter 16. The residence 10 further includes an electric power transfer port 18 through which the electric power is transferred between the residence 10 and a vehicle 30. The electric power transfer port 18 is connectable with an electric power transfer port 37 of the vehicle 30 via a plug 36. Hereinafter, the electric power transfer port 37 of the vehicle 30 is also referred to as an inlet 37. The inlet 37 is connected with a battery 32 of the vehicle 30 via a converter 34 equipped to the vehicle 30. Hereinafter, the converter 34 is also referred to as a vehicle converter 34.

The residence 10 further includes a controller 40 that performs an electric power control within an electric power system including the solar panel 12, the load 14, the residence converter 16, and the electric power transfer port 18. In the present embodiment, the controller 40 performs the electric power control in order to control the electric power within the electric power system. In the present embodiment, the controller 40 controls both the residence converter 16 and the vehicle converter 34. Specifically, the controller 40 controls the residence converter 16 in order to control electric power supplied from the utility grid 20. Further, the controller 40 controls the vehicle converter 34 of the vehicle 30 via the electric power transfer port 18 in order to control an amount of an electric power transferred between the battery 32 and the electric power system. The controller 40 controls the vehicle converter 34 by transmitting a command to a vehicle controller (not shown) included in the vehicle 30. The solar panel 12 may generate an electric power Psp by a well-known maximum power point tracking (MPPT) control. Hereinafter, the electric power Psp generated by the solar panel 12 is also referred to as a generation power Psp, and the electric power Psys supplied from the utility grid 20 is also referred to as a system supply power Psys, and the electric power transferred between the battery 32 and the electric power system is also referred to as a transfer power Pb. The transfer power Pb transferred between the battery 32 and the electric power system is the electric power, which is charged to or discharged from the battery 32.

The controller 40 performs the electric power control based on a model predictive control (MPC) method. Specifically, the controller 40 sets the system supply power Psys, which is needed to be supplied from the utility grid 20, and the transfer power Pb, which is needed to be transferred between the battery 32 and the electric power system, based on the generation power Psp and a predicted unavailable period of the battery 32 of the vehicle 30. Then, the controller 40 performs the electric power control based on the set system supply power Psys and the set transfer power Pb. The controller 40 sets the system supply power Psys, which is needed to be supplied from the utility grid 20, under a condition that a predetermined advantage is provided by the set system supply power Psys. The predetermined advantage may refer to a minimum cost of using the electric power system or a maximum usage rate of the generation power Psp of the solar panel 12. The cost of using the electric power system may refer to a cost of using the system power Psys supplied from the utility grid 20. In the present embodiment, the system supply power Psys and the transfer power Pb are set for the next 24 hours from a present time so that the predetermined advantage is provided. Hereinafter, the 24 hours, during which the system supply power Psys and the transfer power Pb are predicted and set, is also referred to as a plan period. The setting of the system supply power Psys and the transfer power Pb is executed every 30 minutes during the plan period. That is, a setting cycle time Tc of the system supply power Psys and the transfer power Pb is 0.5 hour. Hereinafter, the setting cycle time of the system supply power Psys and the transfer power Pb is also referred to as a control cycle Tc. Since the system supply power Psys and the transfer power Pb are repeatedly set every 30 minutes, robustness responsive to a prediction error is improved. Usually, an optimum value for the utilization plan during a limited time scale is not always equal to an optimum value for the utilization plan during a long-term time scale. Thus, in the present embodiment, the plan period is set longer than the control cycle Tc. Hereinafter, the plan period is also referred to as a prediction term.

The controller 40 further predicts the electric power Psp generated by the solar panel 12. For example, the controller 40 predicts the electric power Psp based on weather information that is acquired by a communication device from an external device.

In the present embodiment, the electric power system further includes an availability prediction apparatus (PREDICT APPA) 42 that predicts an availability specified period of the battery 32 during the prediction term. The availability specified period of the battery 32 to be predicted by the availability prediction apparatus 42 is also referred to as a coming availability specified period. In the present embodiment, the availability specified period may be set as one of the unavailable period and an available period of the battery 32 of the vehicle 30. The unavailable period of the battery 32 is a period during which the inlet 37 is electrically disconnected with the electric power transfer port 18 and the battery 32 is unavailable when the controller 40 performs the electric power control within the electric power system. The available period of the battery 32 is a period during which the inlet 37 is electrically connected with the electric power transfer port 18 via the plug 36 and the battery 32 is available when the controller 40 performs the electric power control within the electric power system. The present embodiment will describe a case in which the availability specified period is set as the unavailable period as an example. The availability prediction apparatus 42 includes a central processing unit (CPU) 44 and a memory 46. The following will describe a process executed by the availability prediction apparatus 42 with reference to FIG. 2 to FIG. 6C. Specifically, the process is executed by the CPU 44 of the availability prediction apparatus 42. Usually, a start point of the unavailable period is equal to a departure time of the vehicle 30 away from the residence 10, and an end time of the unavailable period is equal to an arrival time of the vehicle 30 back to the residence 10. Hereinafter, the start point of the unavailable period is referred to as the departure time, and the end point of the unavailable period is referred to as the arrival time.

Figure 2:
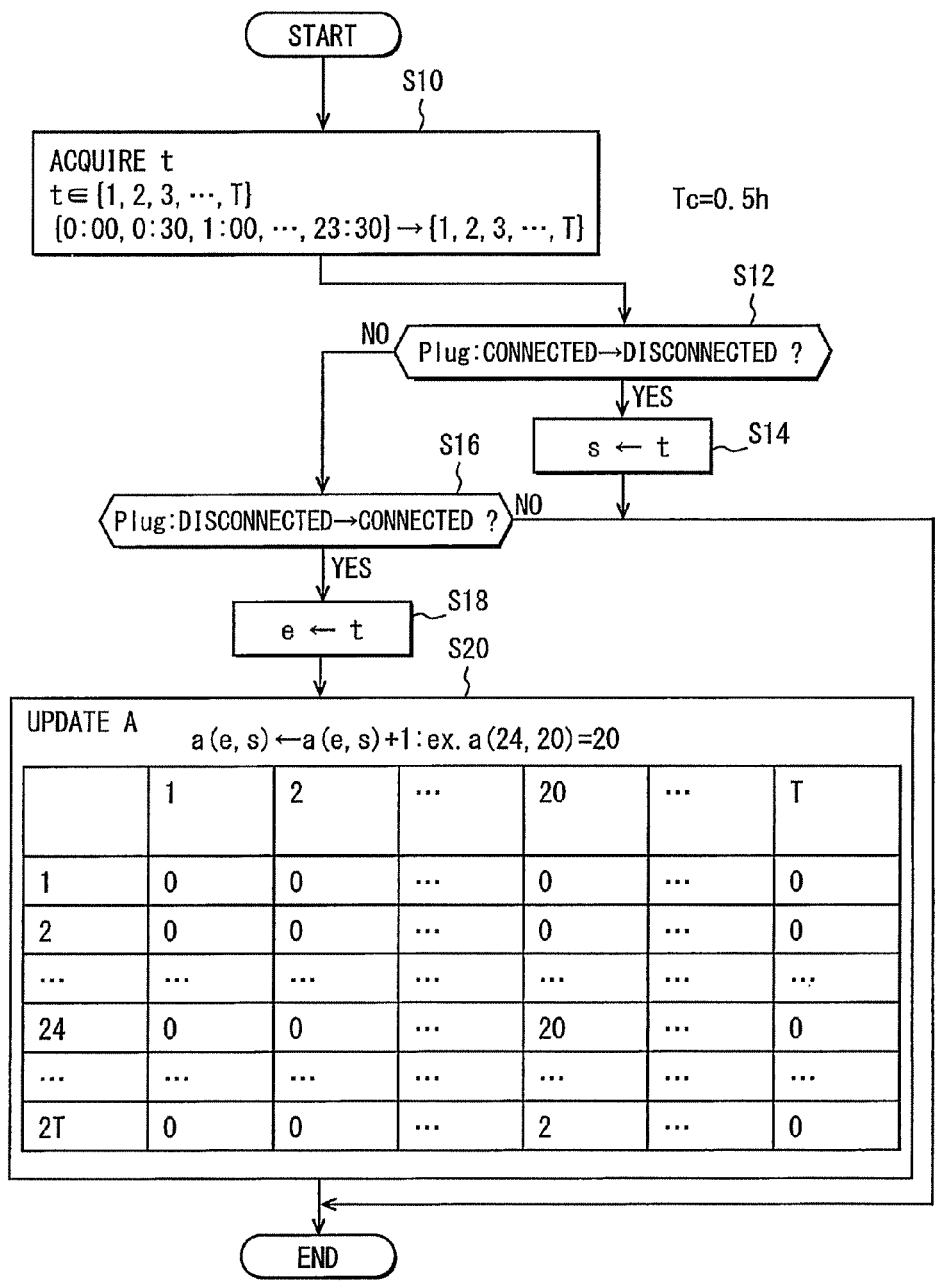
FIG. 2 is a flowchart showing a creating process of frequency distribution data according to the first embodiment.

The following will describe a preparing process of a frequency distribution data of the unavailable period executed by the availability prediction apparatus 42 with reference to FIG. 2. The process shown in FIG. 2 is repeatedly executed every 30 minutes. That is, a control cycle of the preparing process, which prepares the frequency distribution data of the unavailable period, is 0.5 hour.

As shown in FIG. 2, when the preparing process of the frequency distribution data starts, the availability prediction apparatus 42 acquires a present time t, and specifies an identification number corresponding to the present time t at S10. For a description convenience, the present time t is described by an identification number corresponding to the present time t. In the present embodiment, 24 hours is divided into predetermined number T of time segments, such as 48 time segments, and the present time t is supposed to be a predetermined time point, such as 0:00. When 24 hours is divided into 48 time segments, each time segment has a length of 30 minutes (0.5 hour). Further, each time segment is assigned a discretized identification number in the increasing order. For example, a segment, which starts at a time point of 0:00 and ends immediately before a time of 0:30, has an identification number of 1, and a segment, which starts at a time point of 0:30 and ends immediately before a time point of 1:00, has an identification number of 2. The processes executed at S10 and S30, which will be described later, configure a correlating section.

At S12, the availability prediction apparatus 42 determines whether the inlet 37 is switched from an electrically connected state to an electrically disconnected state with the power transfer port 18 via the plug 36. That is, the availability prediction apparatus 42 determines whether the present time t is the departure time s of the vehicle 30. The process executed at S12 functions as a part of a second determination section.

When the availability prediction apparatus 42 determines that the inlet 37 is switched from the electrically connected state to the electrically disconnected state, the availability prediction apparatus 42 determines that the present time t is the departure time. Then, the availability prediction apparatus 42 proceeds to S14. At S14, the availability prediction apparatus 42 assigns a value of the present time t to the departure time s.

When the availability prediction apparatus 42 determines that the inlet 37 is not switched from the electrically connected state to the electrically disconnected state, the availability prediction apparatus 42 further determines whether the inlet 37 is switched from the electrically disconnected state to the electrically connected state. The process executed at S16 functions as a part of the second determination section. When the inlet 37 is switched from the electrically disconnected state to the electrically connected state, the availability prediction apparatus 42 assigns the value of the present time t to the arrival time e.

At S20, the availability prediction apparatus 42 updates a frequency distribution matrix A. The frequency distribution matrix A is stored in the memory 46 shown in FIG. 1. The frequency distribution matrix A stores frequency information of unavailable periods that are occurred in the past. The availability specified periods stored in the memory 46, in this case the unavailable periods, are also referred to as historical availability specified periods. As shown in FIG. 2, each unavailable period in the frequency distribution matrix A is specified by the departure time s and the arrival time e. In the present embodiment, suppose that the frequency information of the unavailable periods is set as occurrence number of the unavailable periods during the prediction term. At S20, the frequency of the unavailable period specified by the departure time s and the arrival time e is incremented by one. Herein, the frequency of the unavailable period may be set as the number of occurrences of the unavailable period. The process executed at S20 functions as an increment section. The memory 46 functions as a storage section.

After execution of S14 or S20, the availability prediction apparatus 42 ends the preparing process of the frequency distribution data of the unavailable period. Further, when the availability prediction apparatus 42 determines that the inlet 37 is not switched from the electrically disconnected state to the electrically connected state at S16, the availability prediction apparatus 42 ends the preparing process of the frequency distribution data of the unavailable period.

Figure 3:
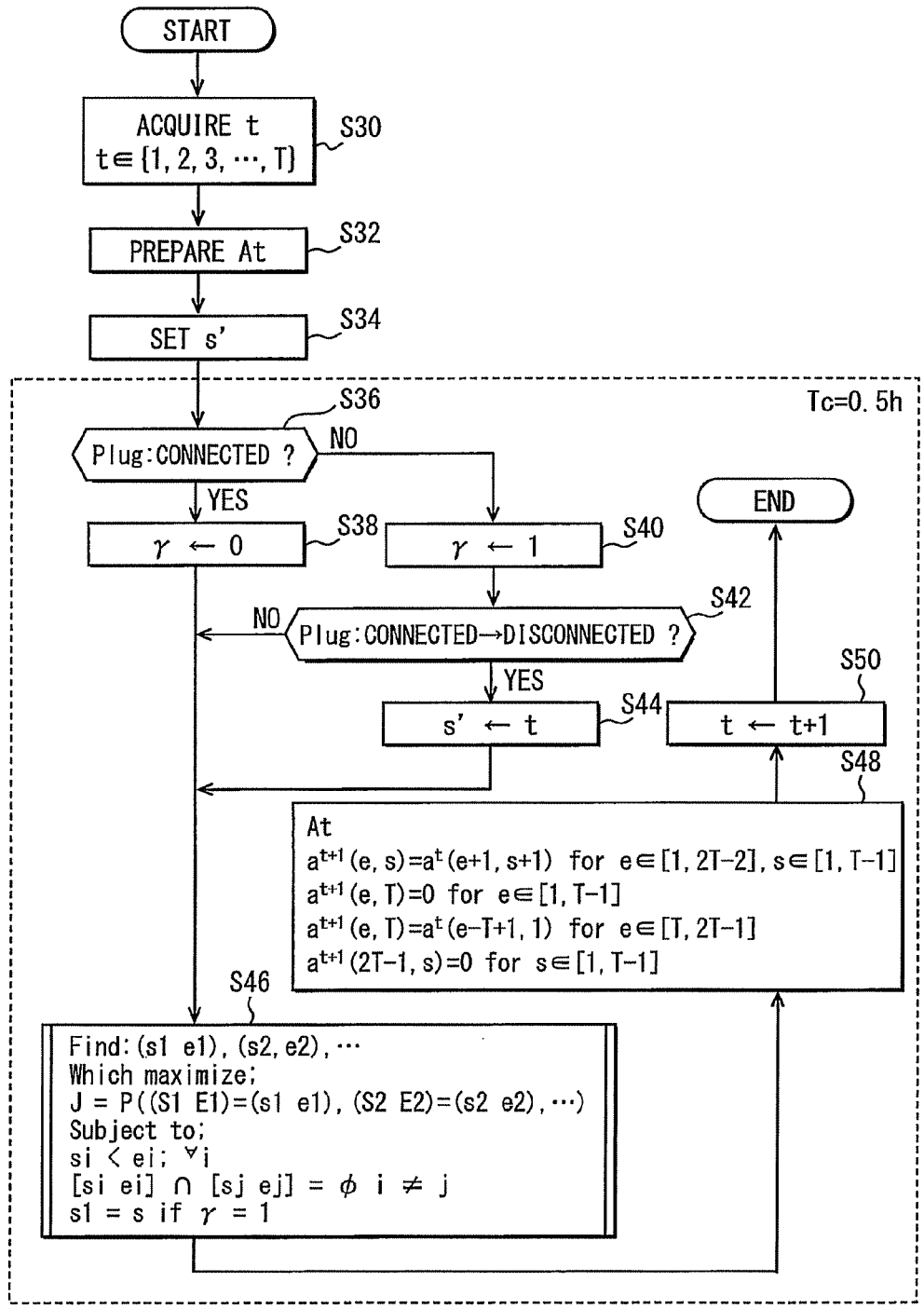
FIG. 3 is a flowchart partially showing an unavailable period prediction process according to the first embodiment.

The following will describe a prediction process of the unavailable period executed by the availability prediction apparatus 42 with reference to FIG. 3.

When the prediction process starts, the availability prediction apparatus 42 acquires the present time t, and specifies an identification number corresponding to the present time t at S30. The acquiring of the present time t and specifying of the identification number of the present time t at S30 are executed in a similar way to the process executed at S10. As described above, the processes executed at S30 and S10 configure the correlating section. At S32, the availability prediction apparatus 42 prepares a real-time frequency distribution matrix At. The real-time frequency distribution matrix At has the same elements with the frequency distribution matrix A. The real-time frequency distribution matrix At is acquired by transforming the frequency distribution matrix A so that each element indicates the frequency of the unavailable period with respect to the present time t. That is, the real-time frequency distribution matrix At, which is transformed from the frequency distribution matrix A, is used to predict the unavailable periods to be occurred in the future with the present time t as a reference. In the real-time frequency distribution matrix At, a value of a column number of each element indicates the departure time relative to the present time t, and a value of a row number of each element indicates the arrival time relative to the present time t. That is, elements $a^t(e, s)$ of the real-time frequency distribution matrix At are equal to the elements of the frequency distribution matrix A, and only an element arrangement in the frequency distribution matrix A may be different from an element arrangement in the real-time frequency distribution matrix At. The preparing process of the real-time frequency distribution matrix At executed at S32 functions as an access section that accesses the storage section 46. The preparing method of the real-time frequency distribution matrix At is shown at S48 of FIG. 3 in details.

At S34, the availability prediction apparatus 42 sets an immediately adjacent departure time s', which occurs before the present time t. When the inlet 37 is not electrically connected with the electric power transfer port via the plug 36, the immediately adjacent departure time s' cannot be determined. Thus, in the present embodiment, the present time t is set as the immediately adjacent departure time s'.

At S36, the availability prediction apparatus 42 determines whether the inlet 37 is in an electrically connected state with the power transfer port 18 via the plug 36. When the availability prediction apparatus 42 determines that the inlet 37 is in the electrically connected state with the power transfer port 18 at S36, the availability prediction apparatus 42 sets a variable r, which indicates whether the battery 32 is available for the electric power transfer control, to zero at S38. Then, the availability prediction apparatus 42 proceeds to S46. When the availability prediction apparatus 42 determines that the inlet 37 is not in the electrically connected state with the power transfer port 18 at S36, the availability prediction apparatus 42 sets the variable r to one at S40. Then, the availability prediction apparatus 42 proceeds to S42. At S42, the availability prediction apparatus 42 determines whether the inlet 37 is switched from the electrically connected state, which corresponds to a past time, with the electric power transfer port 18 to the electrically disconnected state, which corresponds to the present time, with the electric power transfer port 18. When the availability prediction apparatus 42 determines that the inlet 37 is switched from the electrically connected state to the electrically disconnected state with the electric power transfer port 18 at S42, the availability prediction apparatus 42 sets the present time t as the immediately adjacent departure time s' at S44. Then, the availability prediction apparatus 42 proceeds to S46. When the availability prediction apparatus 42 determines that the inlet 37 is not switched from the electrically connected state to the electrically disconnected state with the electric power transfer port 18 at S42, the availability prediction apparatus 42 proceeds to S46.

At S46, the availability prediction apparatus 42 predicts the unavailable periods (s1, e1), (s2, e2) . . . included in the prediction term. Thus, the process executed at S46 functions as a prediction section. Herein, s1, s2 . . . are random variables that specify the departure time, and indicates the number of time segments later than the present time t. For example, when s1 has a value of one, s1 indicates a time point that is later than the present time t by one time segment, which is equal to 30 minutes. Similarly, e1, e2 . . . are random variables that specify the arrival time, and indicates the number of time segments later than the present time t.

At S46, the availability prediction apparatus 42 selects the unavailable periods (s1, e1), (s2, e2) from the real-time frequency distribution matrix At so that each of the selected unavailable periods has the highest occurrence probability P to be an unavailable period in the prediction term. The availability prediction apparatus 42 selects the unavailable periods so that one selected unavailable period (si, ei) is not overlapped with another selected unavailable period (sj, ej). Further, the occurrence probability P of the unavailable period is calculated by a greedy algorithm. The process executed at S46 functions as a selection section. Specifically, a selection of the unavailable periods (s1, e1), (s2, e2) indicates that unavailable periods (t+s1, t+e1), (t+s2, t+e2) are selected. Herein, t+s1 indicates the departure time, and t+e1 indicates the arrival time corresponding to the departure time t+s1. Similarly, t+s2 indicates the departure time, and t+e2 indicates the arrival time corresponding to the departure time t+s2. When t has a value of one, t indicates the time point 0:00 of a predetermined date. Thus, a date and an absolute time point are determined by the set of departure time and the arrival time.

At S48, the availability prediction apparatus 42 updates the real-time frequency distribution matrix At, which is prepared with the present time t as a reference. At S50, the availability prediction apparatus 42 increments the present time t by one. In the present embodiment, S36 to S50 are repeatedly executed every 30 minutes. That is, a control cycle Tc of S36 to S50 is 0.5 hour, which is equal to the control cycle Tc of the control process executed by the controller 40. The process executed at S36 functions as a first determination section.

Figure 4:
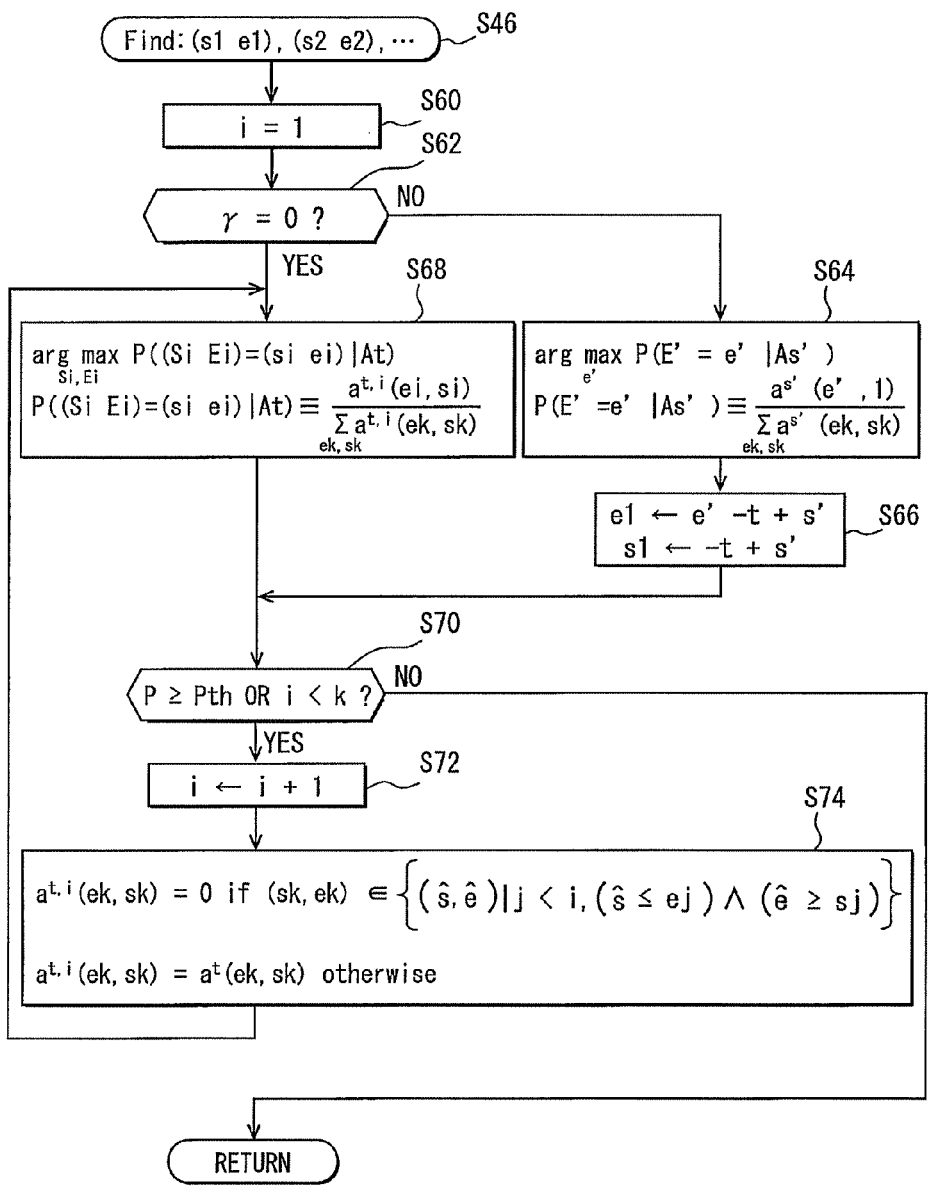
FIG. 4 is a flowchart partially showing the unavailable period prediction process according to the first embodiment.

The following will describe a selection process of the unavailable periods executed by the availability prediction apparatus 42 at S46 in detail with reference to FIG. 4.

When the selection process starts, the availability prediction apparatus 42 sets a variable i as one at S60. The variable i is set for numbering each unavailable period that is selected. When the value of the variable i is small, the unavailable period selected from the real-time frequency distribution matrix At has a high occurrence probability P to be the unavailable period during the prediction term. At S62, the availability prediction apparatus 42 determines whether the variable r is equal to zero or not. When the availability prediction apparatus 42 determines that the variable r is not equal to zero, that is, the battery 32 is unavailable, the availability prediction apparatus 42 proceeds to S64.

At S64, the availability prediction apparatus 42 determines the arrival time e', which corresponds to the departure time s' using the real-time frequency distribution matrix As' under a constraint condition. Herein, real-time frequency distribution matrix As' is the frequency distribution matrix with respect to the departure time s' for predicting the unavailable periods to be occurred with respect to the departure time s'. That is, at S64, the availability prediction apparatus 42 selects the arrival time e' under the constraint condition so that the occurrence probability P of the unavailable period has the maximum value (highest value). Herein, the occurrence probability of the unavailable period having the departure time s' and the arrival time e' is calculated by dividing each element of the real-time frequency distribution matrix As' by a sum of elements of the real-time frequency distribution matrix As'. In FIG. 4, k is a parameter set for the prediction process, and indicates an upper limit of the number of uses of the vehicle 30 to be predicted in a usage pattern. For example, when k has a value of 3 (k=3), the upper limit of the number of uses of the vehicle 30 to be predicted is three times in one day. The arrival time e' specified at S64 corresponds to the element of the real-time frequency distribution matrix As' having the maximum value among the elements that have the departure time s'.

Figure 5A:
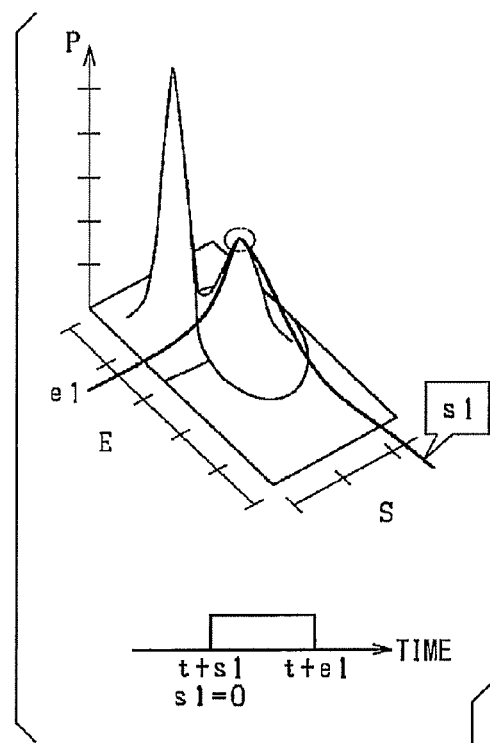
FIG. 5A and FIG. 5B are schematic diagrams showing the unavailable period prediction process according to the first embodiment.

At S66, the availability prediction apparatus 42 calculates the random variable s1 indicating the departure time and the random variable e1 indicating the arrival time Herein, the random variables s1, e1 indicate a relative time with respect to the present time t. Thus, the random variables s1, e1 satisfy the following relationships of e1=e'−t+s' and s1=−t+s'. FIG. 5A shows the random variables e1 s1 specified at S66.

Figure 5B:
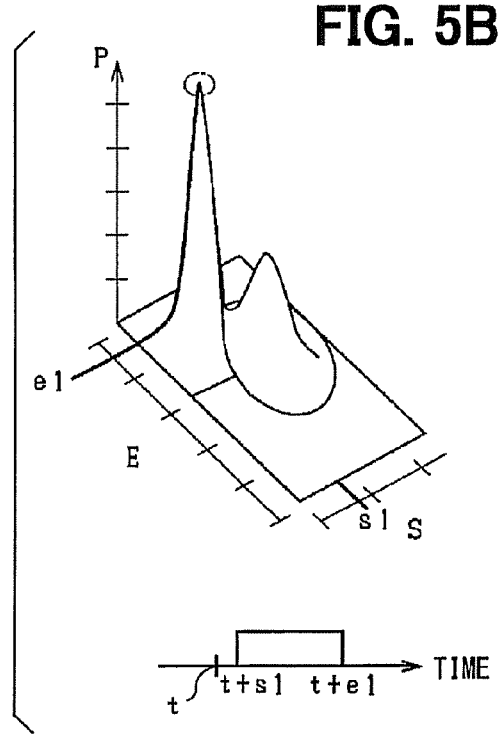

At S62, when the availability prediction apparatus 42 determines that the variable r is equal to zero, that is, the battery 32 is available, the availability prediction apparatus 42 proceeds to S68. At S68, the availability prediction apparatus 42 sets a value of the random variable s1 is equal to or larger than one, and determines the unavailable period (s1, e1) based on the real-time frequency distribution matrix At. That is, at S68, the availability prediction apparatus 42 selects the random variables s1, e1, which make the occurrence probability P of the unavailable period has the maximum value. As shown in FIG. 5B, the availability prediction apparatus 42 selects the random variable s1, which is later than the present time t and is used to specify the departure time, and the random variable e1, which is used to specify the arrival time, so that the occurrence probability P of the element defined by the random variables s1, e1 has the highest occurrence probability P. After execution of S66, S68, the availability prediction apparatus 42 proceeds to S70.

At S70, the availability prediction apparatus 42 determines whether the occurrence probability of the predicted unavailable period is equal to or larger than a threshold value Pth or whether the variable i is smaller than a threshold value k. Herein, k is larger than zero. That is, the availability prediction apparatus 42 determines whether a logical sum of a first condition of "P>=Pth" and a second condition of "i<k" is true at S70. The availability prediction apparatus 42 determines whether to continue to predict the unavailable period based on a determination result of S70. When the logical sum of the first condition of "P>=Pth" and the second condition of "i<k" is true, that is a determination result at S70 is "YES", the availability prediction apparatus 42 determines that a condition for continuing the prediction of the unavailable period is satisfied, and proceeds to S72. At S72, the availability prediction apparatus 42 increments the variable i by one, and proceeds to S74.

At S74, the availability prediction apparatus 42 calculates elements $a^{r,\,i}$ of the frequency distribution matrix to be used. The process executed at S74 provides a solution for satisfying a condition that the unavailable period (si, ei) is not overlapped with the unavailable period (sj, ej). When the specified unavailable period is overlapped with the previously specified unavailable period, the elements $a^{t,i}$ are set to zero. When the specified unavailable period is not overlapped with the previously specified unavailable period, the elements $a^{t,i}$ are the same with the elements $a^t$. As shown in S68 of FIG. 4, the occurrence probability P of the unavailable period defined by the random variables si, ei is defined by dividing the element $a^{t,i}$ (ei, si) by the sum of all of the elements $a^{t,i}$. Thus, the condition that the unavailable period (si, ei) is not overlapped with the unavailable period (sj, ej) is satisfied.

After execution of S68, the availability prediction apparatus 42 returns to S68.

Figure 6A:
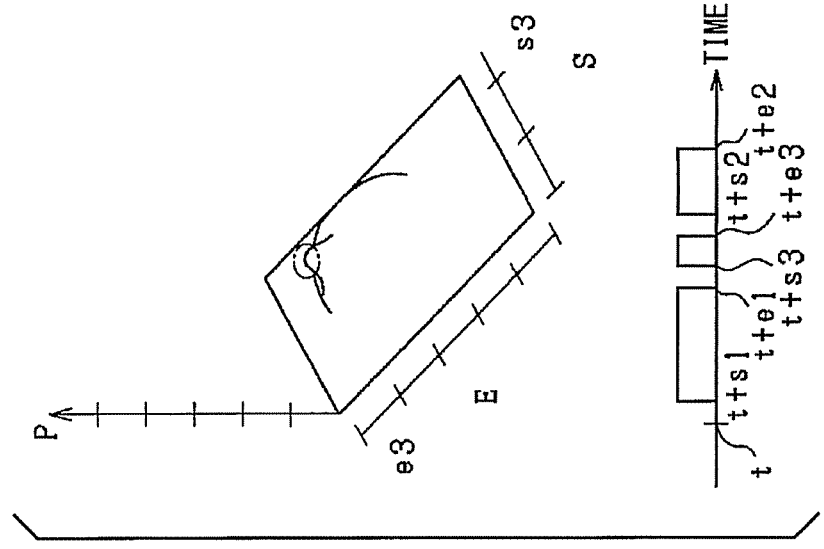
FIG. 6A to FIG. 6C are schematic diagrams showing the unavailable period prediction process according to the first embodiment.
Figure 6B:
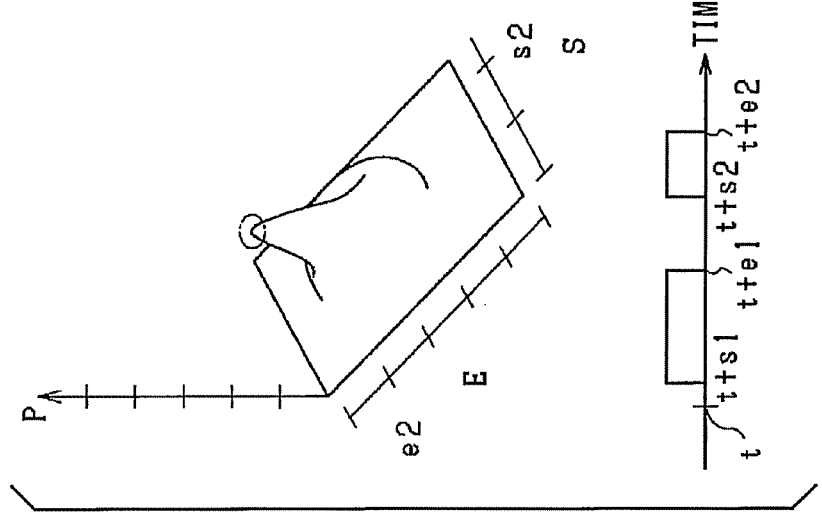
Figure 6C:
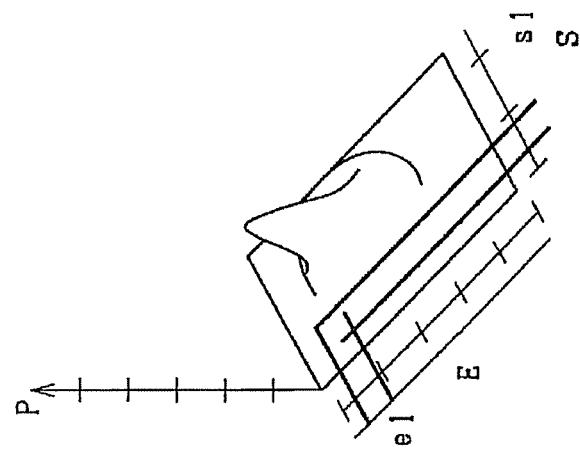

With above-described configuration, the unavailable period is repeatedly selected until the occurrence probability P is smaller than the threshold value Pth or the variable i is equal to the threshold value k. As shown in FIG. 6A, after the unavailable period (s1, e1) is selected, an occurrence probability of the period overlapped with the selected unavailable period (s1, e1) is set to zero by the process executed at S74, S68. Thus, the period overlapped with the selected unavailable period (s1, e1) is avoided to be selected again. As shown in FIG. 6B, an unavailable period (s2, e2) having the next highest occurrence probability is selected from the unavailable periods, which are not overlapped with the selected unavailable period (s1, e1). As shown in FIG. 6C, an occurrence probability of the period overlapped with the selected unavailable period (s2, e2) is set to zero. Thus, the period overlapped with the selected unavailable period (s2, e2) is avoided to be selected again. Then, an unavailable period (s3, e3) having the next highest occurrence probability is selected from the unavailable periods, which are not overlapped with the selected unavailable periods (s1, e1), (s2, e2).

When the availability prediction apparatus 42 determines that the logical sum of the first condition of "P>=Pth" and the second condition of "i<k" is false, that is a determination result at S70 is "NO", the availability prediction apparatus 42 skips the following steps and finishes the process at S46.

The availability prediction apparatus 42 according to the present embodiment provides the following advantages.

In the present embodiment, the availability prediction apparatus 42 for the electric power storage device 32 of the electric power system includes the CPU 44, which function as the access section S32 and the prediction section S46. The electric power system includes the controller 40 that executes the electric power transfer control using the battery 32 of the vehicle 30. The battery 32 functions as the electric power storage device. The access section S32 accesses the storage section 46, which stores the availability specified periods occurred before the present time associated with respective frequencies of the availability specified periods. The access section S32 further acquires the availability specified periods and the respective frequencies of the availability specified periods from the storage section 46. Herein, all of the availability specified periods are defined as the available periods, or all of the availability specified periods are defined as the unavailable periods. During the available periods, the electric power storage device 32 is available for the electric power transfer control. During the unavailable periods, the electric power storage device 32 is unavailable for the electric power transfer control during the unavailable periods. The prediction section S46 executes the prediction process in order to predict at least one target availability specified period to be occurred within the prediction term based on the availability specified periods and the respective frequencies of the availability specified periods acquired by the access section S32. Herein, the prediction term begins at the present time and ends at the time later than the present time by the predetermined term. The prediction section S46 includes the correlating section S10, S30 and the selection section S64, S68. The correlating section S10, S30 correlates the availability specified periods acquired by the access section S32 with candidate periods included in the prediction term. The selection section S64, S68 specifies and selects one of the candidate periods having the highest occurrence probability, which is correlated with one of the availability specified periods having the highest frequency. Then, the prediction section S46 sets the one of the candidate periods having the highest occurrence probability as the target availability specified period. Then, the controller 40 of the electric power system executes the electric power transfer control based on the target availability specified period predicted by the prediction section S64, S68.

That is, the available period or the unavailable period that may be occurred during the prediction term in the future is predicted based on the available periods or the unavailable periods, which are recorded and stored in advance as the frequency distribution matrix A in the storage section 46. Thus, the unavailable periods or the available periods of the electric power storage section 32 are predicted and used for the electric power transfer control even when a schedule to use the vehicle 30 is not input to the electric power system by the user. Further, the availability specified period having the highest occurrence probability in the prediction term is selected as the target availability specified period, and the electric power transfer control is executed based on the availability specified period having the highest occurrence probability. Thus, a prediction accuracy of the availability specified period in the prediction term is improved.

In the present embodiment, the prediction section S46 repeatedly executes the prediction process at the prediction cycle, and the prediction cycle is set to be shorter than the prediction term.

Thus, a prediction error can be corrected promptly in response to an occurrence of the prediction error.

In the present embodiment, the availability prediction apparatus 42 includes the first determination section S36 that determines whether the electric power storage device 32 is available or unavailable for the electric power transfer control and outputs a connection determination result of the electric power storage device 32. When the prediction section S46 determines that a time corresponding to the connection determination result is included in the target availability specified period, the prediction section S46 sets the time corresponding to the connection determination result as a start point of the target availability specified period, and predicts an end point of the target availability specified period. When the prediction section S46 determines that the time corresponding to the connection determination result is not included in the target availability specified period, the prediction section S46 predicts that the target availability specified period occurs later than the time corresponding to the connection determination result.

As described above, when the electric power storage device 32 is unavailable, the availability prediction apparatus 42 sets the start point of the unavailable period (s1, e1) corresponding to the present time at which the battery 32 becomes unavailable, and predicts the end point of the unavailable period (s1, e1). Herein, the start point is indicated by the random variable s1, and the end point is indicated by the random variable e1. The random variable s1 indicates the departure time of the vehicle 30 with respect to the present time, and the random variable e1 indicates the arrival time of the vehicle 30 with respect to the present time. With this configuration, a previously predicted unavailable period or available period can be corrected based on an actual situation over time, and a prediction accuracy of the unavailable period is improved.

In the present embodiment, the storage section 46 stores the availability specified periods, which are included in the memorization unit term before the present time, associated with the respective frequencies of the availability specified periods. The length of the memorization unit term may be set as N times of 24 hours, and herein N is a positive integer. Further, the length of the availability specified period is set equal or shorter than 24 hours. The correlating section S10, S30 may correlate the availability specified periods included in the memorization unit term with the candidate periods included in the prediction term under a condition that a start point of each of the availability specified periods included in the memorization unit term is equal to a start point of the candidate period that is correlated and an end point of each of the availability specified periods term included in the memorization unit term is equal to an end point of the candidate period that is correlated.

As described above, the unavailable period or the available period included in the frequency distribution matrix A is defined to be equal to or shorter than 24 hours. With this configuration, the candidate periods (time points) included in the prediction term can be easily correlated with the unavailable periods (time points) included in the frequency distribution matrix A. Herein, the time points of the candidate periods included in the prediction term are correlated with the time points of the unavailable periods occurred in the past so that the time points (start time and end time) of the candidate periods included in the prediction term are equal to the time points of the unavailable periods stored in the frequency distribution matrix A.

In the present embodiment, the prediction section S46 may predict multiple target availability specified periods during the prediction term. In this case, the selection section S64, S68 selects the target availability specified periods under a condition that the target availability specified periods, which have been selected, are not overlapped with one another.

With this configuration, multiple unavailable periods or available periods can be predicted and each of the unavailable periods or each of the available periods is not overlapped with one another. With this configuration, a physically-meaningful prediction is performed by the availability prediction apparatus 42.

Further, the greedy algorithm is used to predict multiple unavailable periods or the available periods. Thus, a calculation load is reduced compared with a case in which the occurrence probability calculation is performed under a strict condition.

In the present embodiment, after the selection section S64, S68 selects the one of the candidate periods having the highest occurrence probability, under a condition that the target availability specified periods, which have been selected, are not overlapped with one another, the selection section S64, S68 further repeatedly selects another one of the candidate periods having the next highest occurrence probability from the candidate periods once or more times when the next highest occurrence probability of the another one of the candidate periods is equal to or higher than the threshold value Pth.

As described above, the unavailable period or the available period is repeatedly predicted until the occurrence probability P of the candidate period is smaller than the threshold value Pth. Thus, even when the greedy algorithm is used to calculate multiple unavailable periods or multiple available periods, an unavailable period having an occurrence probability lower than the threshold value Pth is appropriately restricted to be predicted by the availability prediction apparatus 42.

In the present embodiment, the unavailable periods or the available periods of the electric power storage device 32 equipped to the vehicle 30 is predicted. The unavailable period or the available period of the electric power storage device 32 is an uncertain object and a potential for bias of the unavailable period or the available period is relatively high. Thus, the unavailable period is appropriate as a prediction target based on a frequency distribution.

In the present embodiment, each time when the unavailable period occurs, the availability prediction apparatus 42 updates the frequency distribution matrix A. With this configuration, a reliability of the frequency distribution matrix A is improved.

In the present embodiment, the prediction section S46 repeatedly performs the prediction process at the prediction cycle in order to repeatedly predict the target availability specified period. The controller 40 of the electric power system repeatedly executes the setting process in order to repeatedly set a transfer power needed to be charged to or discharged from the electric power storage device 32 at a setting cycle based on the target availability specified period predicted by the prediction section S46. The setting cycle of the setting process is equal to the prediction cycle of the prediction process. The controller 40 of the electric power system performs the electric power transfer control in the electric power storage device 32 based on the transfer power.

As described above, the prediction cycle Tc of the unavailable period or the available executed by the availability prediction apparatus 42 is set equal to the control cycle of the model predictive control executed by the controller 40. Suppose that the prediction cycle Tc of the unavailable period is longer than the control cycle of the model predictive control, a part of the prediction cycle Tc of the unavailable period is not reflected in the control cycle of the model predictive control. Thus, when the prediction cycle Tc of the unavailable period is set equal to the control cycle of the model predictive control, a redundancy of the prediction cycle Tc of the unavailable period is limited. Further, a latest prediction result of the unavailable period can be used in each control cycle.

Further, the setting cycle of the setting process may be set shorter than the prediction cycle of the prediction process.

Second Embodiment

The following will describe an availability prediction apparatus according to a second embodiment of the present disclosure. The following will mainly describe different parts of the availability prediction apparatus according to the second embodiment compared with the availability prediction apparatus according to the first embodiment.

Figure 7:
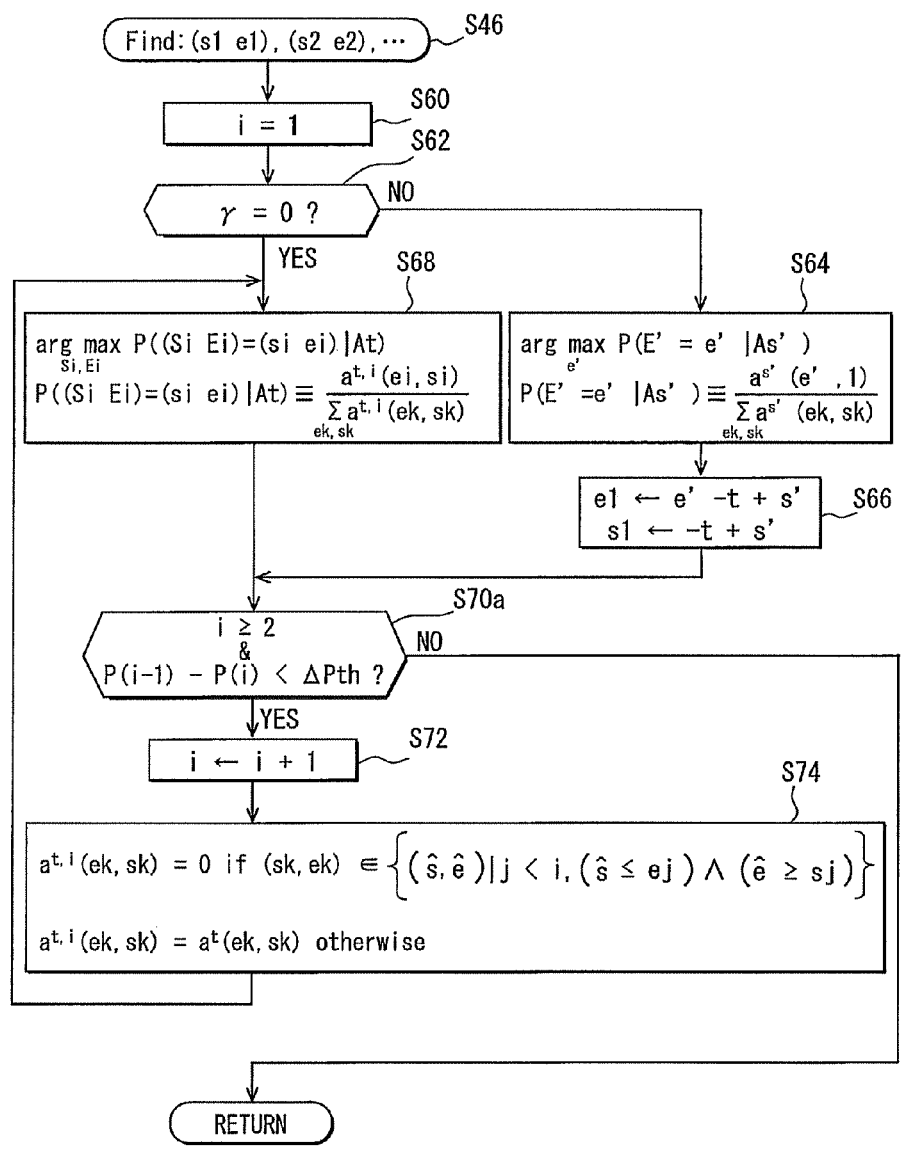
FIG. 7 is a flowchart showing an unavailable period prediction process according to a second embodiment.

FIG. 7 shows a selection process S46 of the unavailable periods executed by the availability prediction apparatus 42 according to the present embodiment. In FIG. 7, a process same with the process shown in FIG. 4 has the same reference number.

As shown in FIG. 7, when S66, S68 are finished, the availability prediction apparatus 42 determines whether a logical conjunction of a first condition of "i>=2" and a second condition of "P(i−1)−P(i)<ΔPth" is true at S70a. That is, the availability prediction apparatus 42 determines whether the variable i is equal to or larger than two and a difference between an immediately previous occurrence probability P(i−1) and a currently calculated occurrence probability P(i) is smaller than a difference threshold value ΔPth. The availability prediction apparatus 42 determines whether to continue to predict the unavailable period based on a determination result of S70a.

In the present embodiment, the availability prediction apparatus 42 determines whether to continue a prediction of the unavailable period in response to a determination result of the second condition of "P(i−1)−P(i)<ΔPth".

More specifically, in the present embodiment, after the selection section S64, S68 selects the one of the candidate periods having the highest occurrence probability P, under a condition that the unavailable periods have been selected are not overlapped with one another, the selection section S64, S68 further repeatedly selects another one of the candidate periods having the next highest occurrence probability from the candidate periods once or more times when the next highest occurrence probability of the another one of the candidate periods, which is to be selected, is decreased compared with the highest occurrence probability of the one of the candidate periods, which has been selected immediately before, or the next highest occurrence probability of the another one of the candidate periods, which has been selected immediately before, and the decreased amount is smaller than the difference threshold value ΔPth.

With this configuration, in a case where a schedule of using the vehicle 30 varies widely and multiple unavailable periods having wide frequency distributions are occurred, the availability prediction apparatus 42 is able to appropriately determine whether to continue a prediction of the unavailable periods. That is, when multiple unavailable periods having wide frequency distributions occur and the threshold value Pth is set as described in the first embodiment, it is possible that none of the unavailable periods has the occurrence probability P larger than the threshold value Pth. In the present embodiment, the availability prediction apparatus 42 determines whether the decreased amount of the occurrence probability P is smaller than the difference threshold value ΔPth. Thus, when the probabilities of the unavailable periods having wide frequency distributions occur, the availability prediction apparatus 42 can continue the prediction of the unavailable periods.

Other Embodiments

The following will describe other embodiments of the present disclosure, which are modified from the foregoing embodiments.

In the foregoing embodiments, a memorization unit term of the frequencies of the unavailable periods is set as 24 hours.

Further, the memorization unit term may be set to a term other than 24 hours. For example, the memorization unit term may be set as one week. When the memorization unit term is set as one week and the prediction term is set as one day, the correlating section may correlates the unavailable periods to be predicted in the prediction term with the unavailable periods included in the corresponding day of the memorization unit term. For example, when the prediction term is Monday, the correlating section may correlate the unavailable periods of the prediction term with the unavailable periods included in the Monday of the memorization unit term. The frequency distributions of the unavailable periods are substantially different during weekdays and during weekends. In a case where the frequency distributions of the unavailable periods during the weekdays does not change substantially and the prediction term is one of the weekdays, the correlating section may correlate the unavailable periods of the prediction term with the unavailable periods included in the whole weekdays of the memorization unit term. Specifically, the correlating section may calculate a sum of the frequencies of each unavailable period during the weekdays, and correlates the unavailable period with the prediction term. Further, one day of the weekdays and one day of the weekends may be set as the memorization unit term.

In the foregoing embodiments, the storage section 46 is included in the availability prediction apparatus 42. Further, the storage section 46 may be not included in the availability prediction apparatus 42. For example, the unavailable periods recorded by the availability prediction apparatus 42 may be transmitted to an external server through a communication line, such as an Internet network, and stores the unavailable periods in the external server. In this case, a storage device included in the external server provides the storage section 46. In this case, the storage section may store unavailable periods transmitted from multiple electric power systems associated with the frequencies of the unavailable periods other than the unavailable periods transmitted from only one multiple electric power system. In this case, suppose that one of the electric power systems is a target electric power system. The access section of the availability prediction apparatus connected to the target electric power system may acquire the unavailable periods and the frequencies of the unavailable periods corresponding to the target electric power system from the storage section included in the external server. Further, the access section of the availability prediction apparatus connected to the target electric power system may acquire the unavailable periods and the frequencies of the unavailable periods corresponding to the target electric power system, and further acquire the unavailable periods and the frequencies of the unavailable periods corresponding to other electric power systems. When the access section corresponding to the target electric power system acquires the unavailable periods and the frequencies from multiple electric power systems, the sampling number of the unavailable periods is larger than a case in which only the unavailable periods and the frequencies of the target electric power system are acquired. Thus, a reliability of the prediction of the unavailable periods based on the statistical data may be improved. Further, when the access section corresponding to the target electric power system acquires the unavailable periods and the frequencies of multiple electric power systems including the target electric power system, the unavailable periods and the frequencies of the target electric power system may be weighted compared with the unavailable periods and the frequencies of other electric power systems. With this configuration, a contribution ratio of the unavailable periods and the frequencies of the target electric power system may be larger than the unavailable periods and the frequencies of other electric power systems. Further, the contribution ratio of the frequencies of the unavailable periods of other electric power systems may be gradually reduced to zero when the sampling number of the unavailable periods of the target electric power system increases.

The data to be stored in the storage section will be described later in detail.

In the foregoing embodiments, the correlating section S10, S30 correlates the unavailable periods, which are acquire by the access section from the storage section, with the unavailable periods included in the prediction term. The unavailable periods included in the prediction term may also be referred to as candidate periods. Further, when the unavailable period having the highest occurrence probability is repeatedly and directly selected based on the frequency distribution data shown in FIG. 2, the correlating section S10, S30 may correlate the unavailable periods during the memorization unit term with the candidate periods during the prediction term such that the start point and the end point of each unavailable period within 24 hours are equal to the start point and end point of one of the candidate periods within the 24 hours.

The correlating section needs to be changed corresponding to a change of the memorization unit term as described above.

In the foregoing embodiments, the selection section S64, S68 specifies the highest occurrence probability period, which is correlated with one of the availability specified periods having the highest frequency, from the candidate periods included in the prediction term and selects the highest occurrence probability period.

In the foregoing embodiments, the selection section is provided by the processes executed at S64, S68. Further, when the electric power device is unavailable at the present time, the selection section may select the unavailable period such that the start point (departure time) of the unavailable period is equal to the present time and predicts the end point (arrival time) of the unavailable period under the constraint condition.

In the first embodiment of the present disclosure, when the logical sum of the first condition of "P>=Pth" and the second condition of "i<k" is true, the selection section repeatedly selects the next highest occurrence probability period from the candidate periods during the prediction term. Further, only when the first condition of "P>=Pth" is satisfied, the selection section may repeatedly select the next highest occurrence probability period from the candidate periods during the prediction term.

In the second embodiment of the present disclosure, when logical conjunction of the first condition of "i>=2" and the second condition of "P(i−1)−P(i)<ΔPth" is true, the selection section repeatedly selects the next highest occurrence probability period from the candidate periods during the prediction term. Further, only when the occurrence probability P(s1, e1)=P(s', e') is smaller than the threshold value Pth, whether to continue the prediction of the unavailable period with respect to i equal to or larger than two may be determined based on the determination condition at S70a. That is, when the occurrence probability P(s1, e1) of the unavailable period is equal to or larger than the threshold value Pth, the selection section executes the selection process according to the flowchart FIG. 4 of the first embodiment.

In the foregoing embodiments, multiple available periods are selected by the greedy algorithm. Further, when multiple unavailable periods are included in the memorization unit term and one of the multiple unavailable periods is selected as the unavailable period of the prediction term, occurrence probability information, which indicates probabilities of remaining multiple unavailable periods included in the memorization unit term to be selected as the unavailable periods of the prediction term, may be stored together with the frequency distribution data. With this configuration, one of the multiple unavailable periods during the memorization unit term may be selected based on the occurrence probability information. That is, the unavailable period having the highest occurrence probability among the remaining unavailable periods is selected as the unavailable period of the prediction term.

In the foregoing embodiments, the availability specified period is set as the unavailable period. Further, the availability specified period may be set as the available period. In this case, when the electric power storage device is available at the time of executing the prediction process, the time at which the electric power storage device is switched to be available is set as the start point of the available period, and the end point of the available period is predicted under the constraint condition.

As described above, when the availability specified period is set as the available period, the frequency distribution data related to the available periods are stored in the storage section.

Further, frequency distribution data related to both the available periods and the unavailable periods may be used to prediction of the available periods and/or the unavailable periods. In this case, when the present time is included in the available period, the available period of the prediction term is predicted. Further, when the present time is included in the unavailable period, the unavailable period of the prediction term is predicted. In order to achieve this configuration, the constraint condition related to the start point of the availability specified period needs to be always set in the prediction process.

In the foregoing embodiments, a quantization unit of the frequency distribution data (0.5 hour) is equal to the prediction cycle of the availability specified periods. Further, the quantization unit of the frequency distribution data may be set different from the prediction cycle of the availability specified periods.

When the prediction cycle of the availability specified periods is set shorter than the prediction term, the prediction cycle is not limited to be set as n-th part of the prediction term. Herein, n is an integer. Further, the prediction cycle is not limited to a period shorter than the prediction term.

In the foregoing embodiments, availability specified periods in the prediction term are predicted so that one availability specified period is not overlapped with another availability specified period. In the foregoing embodiments, the frequency of the availability specified period, which has been selected, is set to zero in order to avoid selecting the same availability specified period again in the prediction term. Further, the availability specified period, which has been selected, may be removed from the availability specified periods from which the next highest occurrence probability period to be selected.

In the foregoing embodiments, the residence is the standard house as well known. Further, the residence may be a multi-unit apartment building. In this case, multiple vehicle batteries may be used by the electric power system including electric devices of the multi-unit apartment building. When predicting the unavailable periods of the vehicle batteries and the number of the vehicle batteries, the unavailable periods and the frequencies of the unavailable period stored before the present time may be used. For example, an identification number, such as a first port, a second port and so on, may be assigned to each of the multiple electric power transfer ports included in the electric power system when the multiple electric power transfer ports are available. Further, the frequencies of the unavailable periods of each electric power transfer port may be stored correlated with the identification number of the electric power transfer port. In this case, one electric power transfer port, which becomes available at the start point of the unavailable period, may be different from the electric power transfer port, which becomes unavailable at the end point of the unavailable period. That is because under a condition that one electric power transfer port is connected with the electric power system and then another electric power transfer port is connected with the electric power system, when the firstly connected electric power transfer port is disconnected, the first port may be switched to another port.

In the foregoing embodiments, the electric power system includes the electric devices arranged in the residence 10. Further, the electric power system may include electric devices arranged in a store, a shop, a restaurant and the like.

In the foregoing embodiments, the determination section determines whether the inlet 37 is connected with the electric power transfer port 18 via the plug 36. Further, the determination section may determine whether the inlet 37 is connected with the electric power transfer port 18 via a wireless connection under a condition that a charge and discharge of the vehicle battery based on the wireless connection is available.

In the foregoing embodiments, the increment section increments the frequency of the unavailable period by one in response to each new detection of the unavailable period. Further, the increment section may decrease each of the frequencies of the already detected unavailable periods by one in response to each new detection of the unavailable period.

The contribution ratio of the frequencies of the unavailable periods, which are occurred during a period that is prior to the present time by a predetermined period, may be reduced over time. For example, the frequency of the unavailable period incremented predetermined days ago may be decreased in order to reduce the contribution ratio of the frequency of the unavailable period incremented predetermined days ago.

In the foregoing embodiments, the control cycle of the charging process executed by the controller is equal to the prediction cycle of the unavailable periods. Further, the control cycle of the charging process executed by the controller may be set different from the prediction cycle of the unavailable periods.

In the foregoing embodiments, the controller is included in the electric power system. Further, the controller may be not included in the electric power system. For example, the controller may be provided by a software section or a hardware section, which are arranged at an external side of the electric power system. In this case, the controller is configured to be communicably connected with the electric power system via a communication link.

In this case, the prediction section may be integrated with the hardware section.

In the foregoing embodiments, the vehicle battery 32 is used as the electric power storage device. Further, an electric power storage device other than the vehicle battery 32 may be used. For example, a portable storage battery and a battery equipped to a power source vehicle may be used as the electric power storage device.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An availability prediction apparatus for an electric power storage device of an electric power system that executes an electric power transfer control using the electric power storage device, the electric power storage device being equipped to a vehicle, the availability prediction apparatus comprising:
    an access section that accesses a storage section storing a plurality of availability specified periods which occurred before a present time associated with respective frequencies of the availability specified periods and acquires the availability specified periods and the respective frequencies of the availability specified periods from the storage section, the availability specified periods being available periods or unavailable periods, wherein, during the available periods, the electric power storage device is available for the electric power transfer control by electrically connecting the vehicle equipped with the electric power storage device to the electric power system, and during the unavailable periods, the electric power storage device is unavailable for the electric power transfer control by electrically disconnecting the vehicle equipped with the electric power storage device from the electric power system; and
    a prediction section that executes a prediction process in order to predict at least one target availability specified period which will occur within a prediction term based on the availability specified periods and the respective frequencies of the availability specified periods acquired by the access section, the prediction term beginning at the present time and ending at a time later than the present time by a predetermined term,
    wherein the prediction section includes:
        a correlating section that correlates the availability specified periods acquired by the access section with a plurality of candidate periods included in the prediction term; and
        a selection section that specifies and selects one of the candidate periods having a highest occurrence probability, which is correlated with one of the availability specified periods having a highest frequency,
    wherein the prediction section sets the one of the candidate periods having the highest occurrence probability as the target availability specified period,
    wherein the electric power transfer control is executed within the electric power system based on the target availability specified period,
    wherein the electric power transfer control includes an electric power supply from the electric power storage device equipped to the vehicle to a load disposed outside of the vehicle and a charging of the electric power storage device equipped to the vehicle with an external power supply,
    wherein the electric power system executes the electric power transfer control during the target availability specified period so that an operation parameter related to the electric power transfer control has an optimum value,
    wherein the prediction section predicts a plurality of the target availability specified periods within the prediction term,
    wherein the selection section selects the target availability specified periods under a condition that the target availability specified periods, which have been selected, are not overlapped with one another, wherein, after the selection section selects the one of the candidate periods having the highest occurrence probability, the selection section further repeatedly selects another one of the candidate periods having a next highest occurrence probability from the candidate periods once or more times when a predetermined condition is satisfied, and wherein, when the next highest occurrence probability of the another one of the candidate periods is equal to or higher than a threshold value, the predetermined condition is satisfied and the selection section selects the another one of the candidate periods having the next highest occurrence probability from the candidate periods.

2. The availability prediction apparatus according to claim 1, wherein, during the prediction term, the prediction section repeatedly executes the prediction process at a prediction cycle, which is shorter than the prediction term.

3. The availability prediction apparatus according to claim 2, further comprising a first determination section that determines whether the electric power storage device is available or unavailable for the electric power transfer control and outputs a connection determination result of the electric power storage device, wherein, when the prediction section determines that a time corresponding to the connection determination result is included in the target availability specified period, the prediction section sets the time corresponding to the connection determination result as a start point of the target availability specified period, and predicts an end point of the target availability specified period, and wherein, when the prediction section determines that the time corresponding to the connection determination result is not included in the target availability specified period, the prediction section predicts that the target availability specified period occurs later than the time corresponding to the connection determination result.

4. The availability prediction apparatus according to claim 2, wherein the storage section stores the availability specified periods, which are included in a memorization unit term before the present time, associated with the respective frequencies of the availability specified periods, wherein a length of the memorization unit term is N times of 24 hours, and herein N is a positive integer, and wherein the correlating section correlates the availability specified periods included in the memorization unit term with the candidate periods included in the prediction term under a condition that a start point of each of the availability specified periods included in the memorization unit term is equal to a start point of the candidate period that is correlated and an end point of each of the availability specified periods included in the memorization unit term is equal to an end point of the candidate period that is correlated.

5. The availability prediction apparatus according to claim 1, wherein the electric power system includes at least one electric device disposed inside of a building.

6. The availability prediction apparatus according to claim 1, further comprising the storage section that stores the availability specified periods occurred before the present time associated with the respective frequencies of the availability specified periods.

7. The availability prediction apparatus according to claim 6, further comprising:

a second determination section that determines whether the electric power storage device is available for the electric power transfer control; and an increment section that increments the frequency of one of the availability specified periods in a relative manner with respect to the respective frequencies of the availability specified periods other than the one of the availability specified periods when the increment section detects an occurrence of the one of the availability specified periods based on a determination result of the second determination section.

8. The availability prediction apparatus according to claim 1, wherein the prediction section repeatedly performs the prediction process at a prediction cycle in order to repeatedly predict the target availability specified period, wherein the electric power system further includes a controller that repeatedly executes a setting process at a setting cycle in order to repeatedly set a transfer power needed to be charged to or discharged from the electric power storage device based on the target availability specified period predicted by the prediction section, wherein the setting cycle of the setting process is equal to or shorter than the prediction cycle of the prediction process, and wherein the controller of the electric power system performs the electric power transfer control in the electric power storage device based on the transfer power.

9. The availability prediction apparatus according to claim 1, wherein the frequencies of the availability specified periods is stored as a frequency distribution matrix.

10. The availability prediction apparatus according to claim 1, wherein the operation parameter related to the electric power transfer control includes a use cost of a system power supplied from a utility grid, and the electric power system executes the electric power transfer control during the target availability specified period so that the use cost of the system power supplied from the utility grid has a minimum value.

11. The availability prediction apparatus according to claim 1, wherein the electric power system further includes a solar panel which generates electric power using sunlight energy, the operation parameter related to the electric power transfer control includes a usage rate of the electric power generated by the solar panel, and the electric power system executes the electric power transfer control during the target availability specified period so that the usage rate of the electric power generated by the solar panel has a maximum value.

12. An availability prediction apparatus for an electric power storage device of an electric power system that executes an electric power transfer control using the electric power storage device, the electric power storage device being equipped to a vehicle, the availability prediction apparatus comprising:

an access section that accesses a storage section storing a plurality of availability specified periods which occurred before a present time associated with respective frequencies of the availability specified periods and acquires the availability specified periods and the respective frequencies of the availability specified periods from the storage section, the availability specified periods being available periods or unavailable periods, wherein, during the available periods, the electric power storage device is available for the electric power transfer control by electrically connecting the vehicle equipped with the electric power storage device to the electric power system, and during the unavailable periods, the electric power storage device is unavailable for the electric power transfer control by electrically disconnecting the vehicle equipped with the electric power storage device from the electric power system; and a prediction section that executes a prediction process in order to predict at least one target availability specified period which will occur within a prediction term based on the availability specified periods and the respective frequencies of the availability specified periods acquired by the access section, the prediction term beginning at the present time and ending at a time later than the present time by a predetermined term, wherein the prediction section includes:
- a correlating section that correlates the availability specified periods acquired by the access section with a plurality of candidate periods included in the prediction term; and
- a selection section that specifies and selects one of the candidate periods having a highest occurrence probability, which is correlated with one of the availability specified periods having a highest frequency, wherein the prediction section sets the one of the candidate periods having the highest occurrence probability as the target availability specified period, wherein the electric power transfer control is executed within the electric power system based on the target availability specified period, wherein the electric power transfer control includes an electric power supply from the electric power storage device equipped to the vehicle to a load disposed outside of the vehicle and a charging of the electric power storage device equipped to the vehicle with an external power supply, wherein the electric power system executes the electric power transfer control during the target availability specified period so that an operation parameter related to the electric power transfer control has an optimum value, wherein the prediction section predicts a plurality of the target availability specified periods within the prediction term, wherein the selection section selects the target availability specified periods under a condition that the target availability specified periods, which have been selected, are not overlapped with one another, wherein, after the selection section selects the one of the candidate periods having the highest occurrence probability, the selection section further repeatedly selects another one of the candidate periods having a next highest occurrence probability from the candidate periods once or more times when a predetermined condition is satisfied, and wherein, when the next highest occurrence probability of the another one of the candidate periods, which is to be selected, is decreased by an amount compared with the highest occurrence probability of the one of the candidate periods, which has been selected immediately before, or the next highest occurrence probability of the another one of the candidate periods, which has been selected immediately before, and the amount is smaller than a difference threshold value, the predetermined condition is satisfied and the selection section selects the another one of the candidate periods having the next highest occurrence probability from the candidate periods.

13. An availability prediction apparatus for an electric power storage device of an electric power system that executes an electric power transfer control using the electric power storage device, the electric power storage device being equipped to a vehicle, the availability prediction apparatus comprising:

an access section that accesses a storage section storing a plurality of availability specified periods which occurred before a present time associated with respective frequencies of the availability specified periods and acquires the availability specified periods and the respective frequencies of the availability specified periods from the storage section, the availability specified periods being available periods or unavailable periods, wherein, during the available periods, the electric power storage device is available for the electric power transfer control by electrically connecting the vehicle equipped with the electric power storage device to the electric power system, and during the unavailable periods, the electric power storage device is unavailable for the electric power transfer control by electrically disconnecting the vehicle equipped with the electric power storage device from the electric power system;

a prediction section that executes a prediction process in order to predict at least one target availability specified period which will occur within a prediction term based on the availability specified periods and the respective frequencies of the availability specified periods acquired by the access section, the prediction term beginning at the present time and ending at a time later than the present time by a predetermined term, wherein the prediction section includes:
- a correlating section that correlates the availability specified periods acquired by the access section with a plurality of candidate periods included in the prediction term; and
- a selection section that specifies and selects one of the candidate periods having a highest occurrence probability, which is correlated with one of the availability specified periods having a highest frequency, wherein the prediction section sets the one of the candidate periods having the highest occurrence probability as the target availability specified period, wherein the electric power transfer control is executed within the electric power system based on the target availability specified period, wherein the electric power transfer control includes an electric power supply from the electric power storage device equipped to the vehicle to a load disposed outside of the vehicle and a charging of the electric power storage device equipped to the vehicle with an external power supply, and wherein the electric power system executes the electric power transfer control during the target availability specified period so that an operation parameter related to the electric power transfer control has an optimum value, wherein the storage section that stores the availability specified periods occurred before the present time associated with the respective frequencies of the availability specified periods, a second determination section that determines whether the electric power storage device is available for the electric power transfer control; and an increment section that increments the frequency of one of the availability specified periods in a relative manner with respect to the respective frequencies of the availability specified periods other than the one of the availability specified periods when the increment section detects an occurrence of the one of the availability specified periods based on a determination result of the second determination section.

* * * * *